(12) United States Patent
Lazcano Lasa

(10) Patent No.: US 8,899,345 B2
(45) Date of Patent: Dec. 2, 2014

(54) FAST-ACTION HARROW-DISC COUPLING

(75) Inventor: Bakame Lazcano Lasa, Legazpia (ES)

(73) Assignee: Bellota Agrisolutions, S.L., Legazpia (Guipúzcoa) (ES)

( * ) Notice: Subject to any disclaimer, the term of this patent is extended or adjusted under 35 U.S.C. 154(b) by 23 days.

(21) Appl. No.: 13/380,567

(22) PCT Filed: Feb. 5, 2010

(86) PCT No.: PCT/ES2010/070064
§ 371 (c)(1),
(2), (4) Date: Mar. 22, 2012

(87) PCT Pub. No.: WO2010/092216
PCT Pub. Date: Aug. 19, 2010

(65) Prior Publication Data
US 2012/0168187 A1    Jul. 5, 2012

(30) Foreign Application Priority Data
Feb. 16, 2009 (ES) .................. 200900290 U

(51) Int. Cl.
*A01B 15/16* (2006.01)
*A01B 23/06* (2006.01)
*A01B 71/04* (2006.01)

(52) U.S. Cl.
CPC ............... *A01B 23/06* (2013.01); *A01B 71/04* (2013.01)
USPC .......................................................... 172/604

(58) Field of Classification Search
CPC ............................. A01B 23/06; A01B 15/16
USPC .......................................................... 172/604
See application file for complete search history.

(56) References Cited

U.S. PATENT DOCUMENTS

| 358,246 | A | * | 2/1887 | Arnett | 172/604 |
|---|---|---|---|---|---|
| 692,190 | A | * | 1/1902 | Bailey | 384/157 |
| 1,663,239 | A | * | 3/1928 | Bucknam | 172/604 |
| 1,954,783 | A | * | 4/1934 | Bohmker | 172/599 |
| 2,197,424 | A | * | 4/1940 | Benjamin | 172/599 |
| 2,746,371 | A | * | 5/1956 | Cook | 172/604 |
| 3,397,933 | A | * | 8/1968 | Hatcher | 384/460 |
| 3,690,385 | A | * | 9/1972 | Weiss | 172/604 |
| 4,420,048 | A | * | 12/1983 | Peterson | 172/568 |

(Continued)

FOREIGN PATENT DOCUMENTS

WO    WO 0219791 A1 * 3/2002

*Primary Examiner* — Thomas B Will
*Assistant Examiner* — Joel F. Mitchell
(74) *Attorney, Agent, or Firm* — Wenderoth, Lind & Ponack, L.L.P.

(57) ABSTRACT

A fast-action harrow-disc coupling for fixing a harrow disc (1) to the corresponding hub (2), which is characterized in that it consists of a planet wheel (4) fixed to the corresponding hub (2), the planet wheel (4) being provided on its front face and centrally with a frustoconical projection (5) having a polygonal base, with a section of a threaded shank (6) protruding centrally from the frustoconical projection (5); it being envisaged that the corresponding disc (1) is provided with a central hole (7) for positioning the polygonal base of the frustoconical projection (5), the disc (1) being fixed by means of the thread of a nut (12) onto the section of the shank (6) corresponding to the frustoconical projection (5), with the arrangement, in between, of a plate (9) having a cavity (10) with a central hole (11) for positioning the frustoconical projection (5) and allowing passing out of threaded shank (6), respectively.

9 Claims, 2 Drawing Sheets

(56) References Cited

U.S. PATENT DOCUMENTS

| | | | |
|---|---|---|---|
| 4,590,869 A * | 5/1986 | Steilen | 111/164 |
| 6,082,276 A * | 7/2000 | Klein et al. | 111/164 |
| 6,913,085 B2 * | 7/2005 | Ruckle | 172/574 |
| 7,464,767 B2 * | 12/2008 | Schilling | 172/604 |
| 7,475,738 B2 * | 1/2009 | Frasier | 172/604 |

* cited by examiner

FAST-ACTION HARROW-DISC COUPLING

OBJECT OF THE INVENTION

The present invention, as expressed in the title of this specification, relates to a fast-action harrow-disc coupling, provided for easily and quickly coupling a disc on the corresponding hub in harrows used in farming.

The object of the invention is to facilitate and perform the operation of coupling or disassembling a disc with respect to the corresponding hub established in the frame of an agricultural harrow, in the shortest time possible.

BACKGROUND OF THE INVENTION

Ploughing systems or for agricultural work using harrows, make a cut on the vegetable matter that may be on the surface of the land, achieving a shredded of that vegetable matter that allows leaving the land in optimal conditions, or at least suitable for carrying out the seeding.

The invention is intended for application in disc harrows, and in particular for carrying out coupling of the disc to the hub corresponding to the frame of the harrow.

As is known, disc harrows are formed by a plurality of discs with the shape of spherical cap rotating about respective hubs attached to the frame of the harrow, which hubs normally form certain angle with the forward direction, besides being inclined with respect to the horizontal plane that obviously corresponds to the land plane, all so that the land cut by each disc in the rotation thereof exerts pressure against the disc itself and makes it rotate.

As mentioned in the preceding paragraph, each disc will be related to a corresponding hub, which means that it is necessary to mount one by one the different discs on the corresponding hubs of the frame to form the harrow. Said assembly and/or disassembly operation, is laborious and there is no known system for a quick change of the discs in their hubs.

Conventionally, the way of centering and coupling each disk to its respective hub is based on the fact that it has a sort of concentric cylindrical neck emerging frontally, which is the means for centering the disc on the hub itself, for which said disc has a hole centrally wherein the neck of the hub is inserted, the disc being thus centered and positioned to finally carry out its coupling or fixation, for which are used several screws passing through a plate of the disc and a flange of the hub on the holes of which the screws are threaded.

Obviously, the use of several screws for fixing o coupling the disc, entails that the work, both for fixing and disassembly of the disc for its change, is slow and uncomfortable.

DESCRIPTION OF THE INVENTION

The invention consists of a new way of carrying out the coupling of the discs of an agricultural harrow to respective hubs established for this purpose in the corresponding frame, allowing simplifying the operation, making it more comfortable and drastically reducing the time spent on it.

In this regard, the coupling of the invention is based on that the hub has solidly connected to it a planet wheel, either forming a single-piece body with the hub itself or fixing to it by means of screws or other fixing system, such as a riveted joint, a welded joint or a threaded joint between the planet wheel and hub, so that the front face of said planet wheel has centrally a frustoconical projection having a polygonal base, from the center of which a section of the threaded shank emerges, so that the disc will have a hole complementary to the base of the frustoconical projection for it to pass through said hole, the final fixation being carried out by a nut that will thread on said shank of the projection, with the interposition of a plate external to the disc and provided with a cavity of location of the frustoconical projection, in which plate a hole has been provided so that the end of the shank can emerge to the front or external face of the plate and be able to carry out the threading of the nut, thus establishing the fixing or coupling of the disc to the hub, with the tightening of a single threadable nut on the only shank or screw emerging from the projection of the hub, which projection on the other hand shall constitute the centering element for the disc in its assembly on the hub.

Therefore, by the proposed solution of coupling of a harrow disc to the respective hub, we have switched from using a plurality of screws to carry out the coupling or fixing, as traditionally, to the use of a single nut, which of course means greater speed in the operation of change of the disc or discs of the harrow, as well as greater convenience and ultimately a minimal loss of time in carrying out the operation.

BRIEF DESCRIPTION OF THE DRAWINGS

To complement the description that will be carried out in the following and in order to help better understand the features of the invention, a set of drawings is attached to the present specification based on which the innovations and benefits of the coupling of a disc to the hub of a harrow, all of it performed in accordance with the object of the invention.

DESCRIPTION OF THE PREFERRED EMBODIMENT

Figure 1:
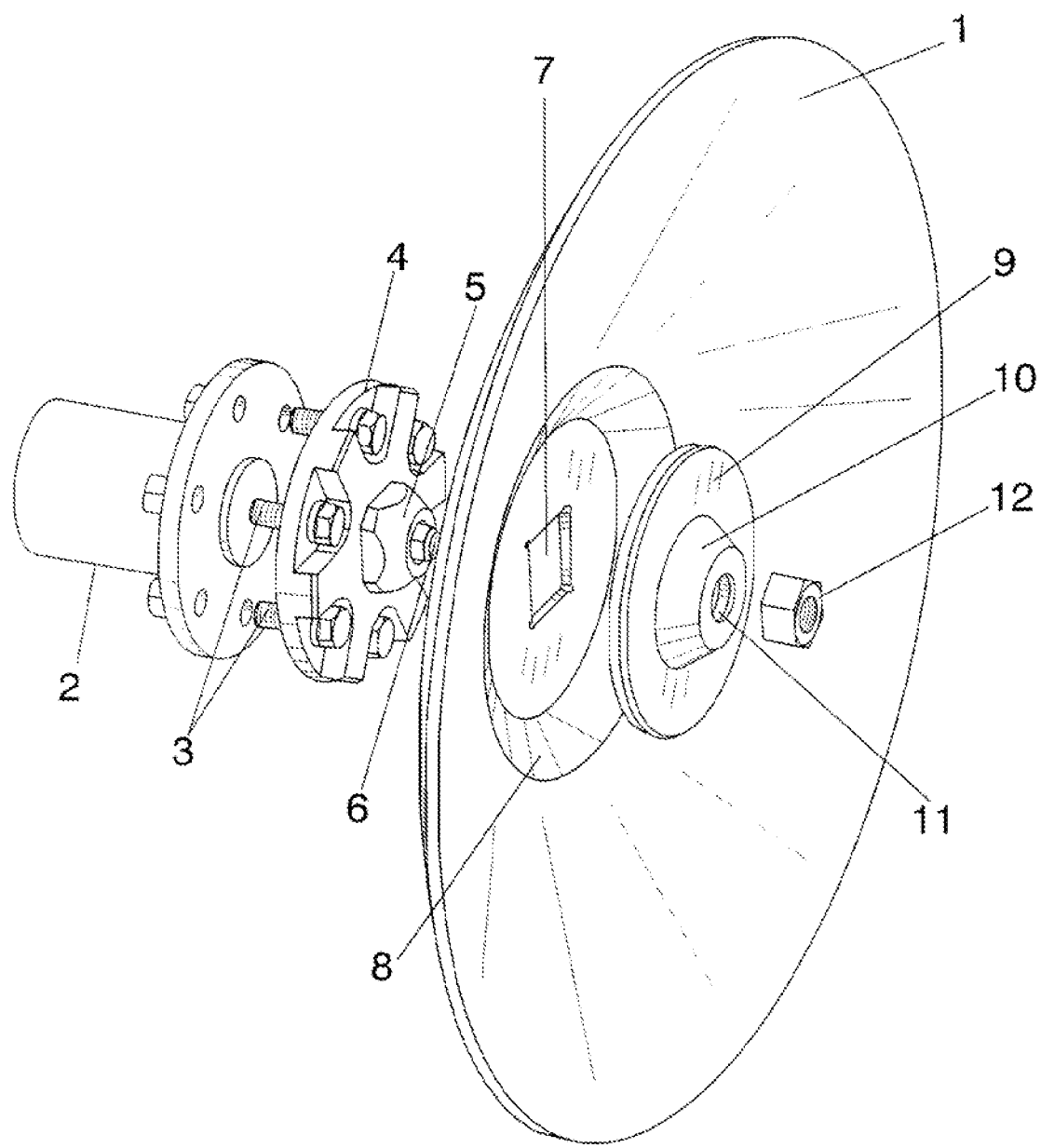
FIG. 1.—Shows a perspective exploded view of the different elements and/or components involved in the coupling of a disc to the hub of the frame of an agricultural harrow performed in accordance with the object of the invention.
Figure 2:
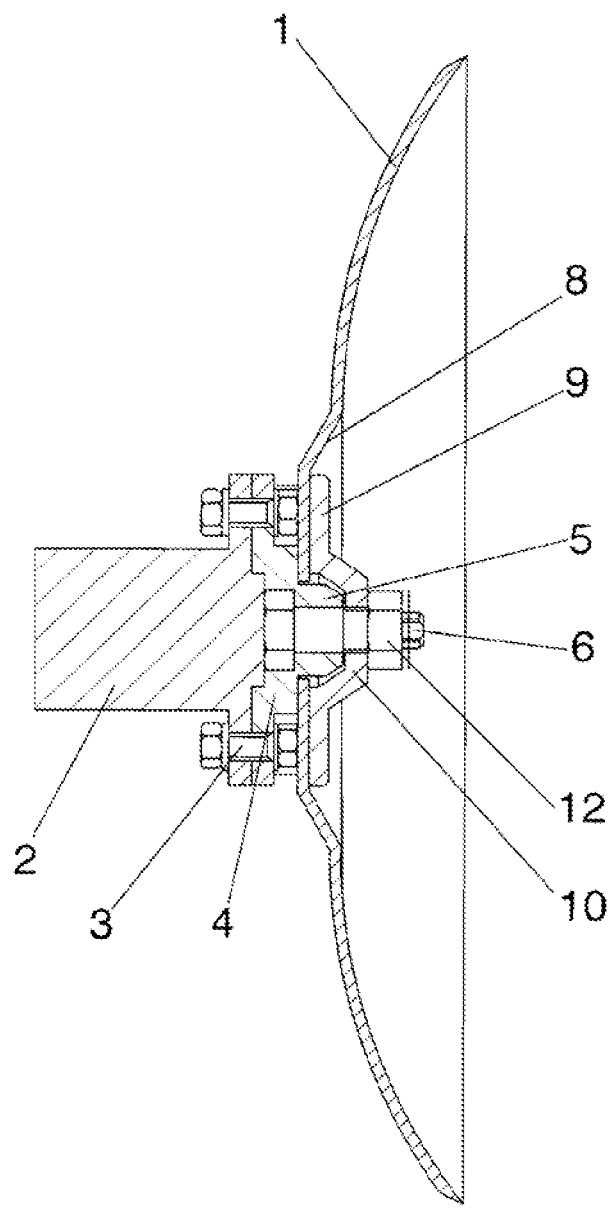
FIG. 2.—Shows a sectional view along a diametral plane of the materialization of the coupling of the invention, fixing a disc to the respective hub.

As it can be seen in the mentioned figures, the coupling of the invention is intended to fix the disc 1 of an agricultural harrow to the respective hub 2 established in the corresponding frame of the harrow, for which it has been anticipated that solidly connected to that hub 2 forming a single-piece body with the same or fixed by means of screws 3 as shown in FIG. 1, a planet wheel 4 is included, that at its outer face has a central and frustoconical projection 5 having a polygonal base and provided on its outside and centrally with a section of the threaded shank 6, while the disc 1 has centrally a hole 7 for positioning of the projection 5, specifically the polygonal base of it in that hole 7 which is also polygonal, thus establishing the centering means of the disc 1 itself with respect to the hub 2, with the special feature that in the disc 1 a concentric housing 8 has been envisaged, at the bottom of which the hole 7 itself is made and in which housing 8 a plate 9 provided with a back cavity 10 is positioned, wherein the frustoconical projection 5 of the planet wheel 4 belonging to the hub 2 is positioned, introducing the section of the threaded shank 6 through a hole 11 provided in the center of the plate 9, so that by a nut 12 the corresponding fixing of the disc 1 to the hub 2 is carried out.

Therefore, assembly and disassembly of the disc 1 with respect to the hub 2 is performed quickly, easily and comfortably, since it is enough to screw or unscrew a nut 12 on a threaded section of the shank 6, avoiding the manipulation of different screws conventionally required for fixing the discs to agricultural harrow hubs.

The invention claimed is:

1. A fast-action harrow-disc coupling, for fixing a harrow-disc (1) to a hub (2) provided in a main frame of a harrow, comprising
a planet wheel (4) solidly connected to the hub (2), said planet wheel (4) having a front face, which, at a center thereof includes a frustoconical projection (5) having a polygonal base, with a section of an outwardly threaded shank (6) centrally protruding from said frustoconical projection (5);
a harrow-disc (1) having a central hole (7) through which the frustoconical projection (5) projects, the central hole (7) having a shape that provides for positional adjustment of the harrow-disc (1) relative to the polygonal base of the frustoconical projection (5),
said harrow-disc (1) being fixed by threading a nut (12) on the section of the outwardly threaded shank (6) of the frustoconical projection (5), with an interposition of a plate (9) provided with a cavity (10) with a central hole (11), the cavity having a shape that fits to the shape of the frustoconical projection (5) and the threaded shank (6) protruding from the central hole;
wherein said harrow-disc (1) has a concentric housing (8), at a bottom of which the central hole (7) is formed, the plate (9) being positioned in the housing (8).

2. A fast-action harrow-disc coupling, according to claim 1, wherein the planet wheel (4) with said frustoconical projection (5) and said section of the threaded shank (6), form a single-piece body with the hub (2).

3. A fast-action harrow-disc coupling, according to claim 1, wherein the planet wheel (4) with said frustoconical projection (5) and said section of the threaded shank (6), is solidly connected to the hub (2) by a plurality of screws (3) passing through the planet wheel (4) and threadable in holes established in a flange of the hub (2) itself.

4. A fast-action harrow-disc coupling, according to claim 1, wherein the planet wheel (4) and the hub (2) are joined together by riveting.

5. A fast-action harrow-disc coupling, according to claim 1, wherein the planet wheel (4) and the hub (2) are joined together by welding.

6. A fast-action harrow-disc coupling, according to claim 1, wherein said housing (8) is constituted by a recess formed in a front face of the harrow-disc (1).

7. A fast-action harrow-disc coupling, according to claim 6, wherein the central hole (7), formed at the bottom of the housing (8), is configured such that the frustoconical projection (5) projects therethrough and into the cavity (10) of the plate (9).

8. A fast-action harrow-disc coupling, according to claim 7, wherein the harrow-disc (1), the planet wheel (4), the plate (9) and the threaded shank (6) are arranged and configured such that said harrow-disc (1) is sandwiched between the plate (9) and the planet wheel (4) with the frustoconical projection (5) protruding through the central hole (7) of the harrow-disc (1) and into the housing (8) of the harrow-disc (1), with the shank (6) extending through the central hole (7) of the disc (1) and the central hole (11) of the plate (9), and with the nut (12) attached onto the shank (6) and securing the plate (9) and the harrow-disc (1) to the planet wheel (4).

9. A fast-action harrow-disc coupling, according to claim 1, wherein the harrow-disc (1), the planet wheel (4), the plate (9) and the threaded shank (6) are arranged and configured such that said harrow-disc (1) is sandwiched between the plate (9) and the planet wheel (4) with the frustoconical projection (5) protruding through the central hole (7) of the harrow-disc (1) and into the housing (8) of the harrow-disc (1), with the shank (6) extending through the central hole (7) of the harrow-disc (1) and the central hole (11) of the plate (9), and with the nut (12) attached onto the shank (6) and securing the plate (9) and the harrow-disc (1) to the planet wheel (4).

* * * * *